UNITED STATES PATENT OFFICE.

HENRY NAUMANN, OF BASLE, SWITZERLAND.

IMPROVEMENT IN PROCESSES OF PREPARING EXTRACT OF MEAT.

Specification forming part of Letters Patent No. 186,605, dated January 23, 1877; application filed May 27, 1876.

*To all whom it may concern:*

Be it known that I, HENRY NAUMANN, of Basle, Switzerland, have invented a new and Improved Mode of Preparing Extract of Meat, of which the following is a specification:

By my improved mode of preparation I am enabled to produce extracts of meat containing all the nutritious ingredients, and retaining all the albumen of the muscular fiber, and all the salts of the meat, in a palatable and concentrated form, soluble in water, differing thus essentially and advantageously from other meat-extracts—such as Liebig's—which contain no albumen, and hence cannot really be ranked among the true nutritious articles of food.

For the successful manufacture of my meat-extract the vessels, &c., used therein should be of porcelain, faience, or of well-enameled metal, particularly as long as the preparation maintains yet an acid character. Wooden vessels, &c., may, however, be used, if, like boxwood, they exert no injurious influence on the material. All the solid chemicals and the liquids used in my process must be absolutely pure.

The weights and measures quoted in this specification are the French, owing to their simplicity and easy mutual convertibility. I have, however, in each case given in parentheses the corresponding weights in avoirdupois.

To enable others skilled in the art to make use of my invention I will now proceed to describe it more fully.

In carrying my invention into effect I take one thousand grammes (one hundred pounds) of beef or mutton, entirely free the same from bones, fat, and skin, and, after chopping the same finely, treat it with two litres (eighty quarts) of distilled or soft water, free from lime. This is then stirred into a paste with one hundred and fifty cubic centimetres (sixteen and one-half pounds) of hydrochloric acid of a specific gravity of 1.12, still further diluted with four measures of water, (thirty-five pounds.) The mixture is then put into a steam-boiler of one and one-half to two atmospheric pressures, and boiled continuously until all the albumen and fibrine of the meat are dissolved. The liquor thus prepared assumes a dark-brown color, and upon filtration leaves but a small residue. Should any vapor escape during this part of the process, the loss of water thus caused must be replaced by suitable addition. During this heating process the boiler should be filled to about one-half or one-third with fluid. If the process is interrupted over night, the mass should remain in the boiler.

In lieu of using hydrochloric acid alone, I sometimes half-boil the mixture, and then add one-third less of the hydrochloric acid first mentioned, and phosphoric acid of specific gravity 1.3.

When it is desired to neutralize the acids, this can readily be done by the aid of bicarbonate of soda, the quantity of which to be used being regulated by the amount of acidity it is desired to give the product.

The liquid may be strained or filtered, if desired, and may be poured into evaporating-pans and evaporated to any desired consistency. In some cases I find it heightens the nutritive qualities of the extract by adding thereto a suitable quantity of wheaten or other flour. To render my extract of meat suitable for use on exploring expeditions, in the army and navy, or for other purposes where its powdered form would be more desirable, I first render the extract completely dry *in vacuo*, grind to powder in a previously-warmed mortar, and finely sift it through a warmed wire sieve. It is then stored in air-tight receptacles, and is ready for immediate use on the addition of a small quantity of hot water.

A modified form of extracts is produced as follows: After separating the fibrine from the liquid extract, I add either phosphoric or citric acid, and dissolve in the liquid pure refined sugar. Sometimes I evaporate to the consistency of thick honey.

I am aware that Stephen Darby obtained a patent dated the 9th January, 1872, No. 122,574, for preparing extract of meat; but my process differs essentially from his in the following particulars: I digest the meat with about fifteen per cent. of hydrochloric acid, or a mixture of hydrochloric and phosphoric acids, and boil it at a pressure of from one and one-half to two atmospheres, (or a temperature of 250° Fahrenheit.) Darby digests his materials at 100° Fahrenheit only, and does not heat to boiling, (water boiling at 212°

Fahrenheit.) Were he to attempt to digest pepsin and pancreas at 212°, the ingredients would be destroyed. The organic nitrogenous alkaloids—kreatine, kreatinine, sarkine, and carnine (newly found)—pass only into solution, or bouillon, together with glue-forming ingredients when meat is for some time boiled with water, in which case the albumen coagulates and separates as an insoluble body. This albumen passes into a solution only when the heating process is carried on under increased pressure. The great advantage secured by my process over that of Darby, and all others that I am acquainted with, is that by boiling under artificially-increased pressure the extract of meat obtained contains albumen and alkaloids containing nitrogen, besides all the organic salts—such as phosphate of potassa, &c.—the whole being in an artificial highly-digested state, thus allowing of their being taken up by the feeblest or diseased stomachs at once without exciting or giving pain to that weakened organ.

Having thus described my invention, the following is what I claim as new therein, and desire to secure by Letters Patent:

The process herein described of preparing extract of meat by first taking the lean portion of meat and treating with distilled or soft water, then adding a suitable acid, after which the liquor is boiled under high pressure, bicarbonate of soda added, and the product evaporated or thickened, substantially as set forth.

In testimony that I claim the foregoing invention I have hereunto set my hand this 26th day of February, 1876.

HENRY NAUMANN.

Witnesses:
H. SALATHÉ,
A. MEYER.